United States Patent [19]

Niibe

[11] 4,031,356

[45] June 21, 1977

[54] HEAT PANEL SAFETY SYSTEM

[76] Inventor: Akitoshi Niibe, No. 4 Nishikubo, Sakuragawa, Shiba Minato,, Tokyo, Japan

[22] Filed: Nov. 20, 1975

[21] Appl. No.: 633,653

[52] U.S. Cl. .............................. 219/509; 219/345; 219/528; 219/541; 219/543; 219/549

[51] Int. Cl.² .......................................... H05B 1/02

[58] Field of Search .......... 219/203, 212, 345, 522, 219/528, 541, 543, 549, 507, 509

[56] References Cited

UNITED STATES PATENTS

| | | | |
|---|---|---|---|
| 2,806,118 | 9/1957 | Peterson | 219/203 |
| 2,977,450 | 3/1961 | Boicay | 219/541 |
| 3,379,859 | 4/1968 | Marriott | 219/522 |
| 3,526,753 | 9/1970 | Aisanich et al. | 219/522 |

Primary Examiner—Volodymyr Y. Mayewsky
Attorney, Agent, or Firm—James Wray

[57] ABSTRACT

A heating panel safety system has electrodes on opposite sides of the heating panel which supply conductive material. A first lead wire has ends connected to spaced terminals on a first electrode, and a second lead wire has ends connected to spaced terminals on a second lead wire. Turns in the lead wires are coupled via a core with a turn in a relay energizing wire. Normally closed circuit breaker contacts of the relay are opened when the relay is energized by a bias current in one of the lead wires, such as caused by a discontinuity in an electrode. Opening of the circuit breakers stops flow of current from a power source to the lead wires.

4 Claims, 4 Drawing Figures

HEAT PANEL SAFETY SYSTEM

BACKGROUND OF THE INVENTION

This invention is concerned with safety device for the heat-emitting surface system coated with conductive paint such as carbon paint to prevent some accidents caused especially by wire disconnection of electrodes. Recently the heat-emitting surface system made out of conductive, thinly stretched sheet material such as conductive carbon paint has been used as means of electrically heating articles such as electric carpet and electric matting. Electrodes placed along edges of sheet surface supply power to thin flexible electrically conductive heat emitting material.

This type of heat-emitting surface ought to be as thin as possible and at the same time to be flexible in order to be handled easily. Flexibility and lightness are particularly important when the articles are merchandised as electric heating spreads or electric blankets. To meet the specifications lead wires and electrodes have taken the structure of a few thin wires laid side by side so as to reduce bulkiness of electrodes.

SUMMARY OF THE INVENTION

This invention has been designed to resolve this problem. The aim of the invention is the creation of safety device for heat-emitting surfaces to prevent electrical accidents caused by the disconnection of electrodes. Terminals are attached to both sides of the sheet which is made of a conductible material like conductible paint. The safety device is equipped with an electric breaker which is operated by bias current produced when one of the terminals snaps. The device consists of detectors inserted between at least one pair of lead wires extending from both ends of electrodes. This safety device is also equipped with circuit breakers connected to the electric power source for the heat-emitting surface system. The circuit breakers are operated by bias current monitored by the detector.

The present invention may be used with any type of heating surface and particularly with any thin panel and especially a thin flexible panel such as an electric blanket. The present invention is used with all such devices in which heat is spread across a panel by a sheet or lattice work or series of conductive elements such as a conductive coating with conductive particles or fibers uniformly or randomly positioned in the coating or in materials formed of strengthening or extending fibers with conductive elements such as carbon fibers or metallic particles or in assemblies of small wires.

The apparatus of the invention is equally useable when conductive electrodes are positioned on opposite sides of a panel or at the top and the bottom of a panel or when the conductive material itself takes the place of the electrodes or when the electrodes are formed similarly to the conductive material.

The hazards against which protection is intended by the present invention are the hazards of breaks or discontinuities in conductors carrying current for distribution over the sheet-like conductive material. The breaks or discontinuities may cause unintended localized heating of an amount sufficient to ignite surrounding materials. One of the forms of heating may occur as arcing between broken conductors.

The present system uses two terminals on each distributive electrode in the panel. The terminals of one electrode are connected to a contact of a circuit breaker, forming substantially a continuous lead wire between the terminals. In one portion of the lead wire a turn is provided, and the turn is coupled through a core to an energizing turn of a relay. A bias current is established in the lead wire and in the turn when one portion of the wire is carrying an undue amount of current to the electrode. That bias current energizes the relay, permitting the circuit breaker contacts of the relay to open in a conventional manner. Turns in lead wires from both electrodes are connected through a unitary core to the energizing turn of the relay.

One object of the invention is the provision of a safety apparatus for heating panels comprising a sheet, first and second electrodes connected to the sheet in spaced relationship between the electrodes, each electrode having spaced terminals connected to the electrode, conductive material connected between the electrodes, a first wire having ends connected to terminals on the first electrode and at least one turn in the first wire between its ends, a second wire having ends connected to terminals of the second electrode, and having a turn in the second wire, core means adjacent the turns, a relay having power terminals, and a relay wire connected to the power terminals and having a turn adjacent the core means, circuit breakers connected to the relay, whereby the relay operates the circuit breakers upon energization of the relay wire, the circuit breaker having first and second pairs of contacts and separate means to complete circuits between contacts in the first and second pairs, a contact in the first pair being connected to the first wire and a second contact in the first pair being connected to a power source, a contact in the second pair being connected to the second wire, and a second contact in the second pair being connected to a power source.

Another object of the invention is the provision of a safety apparatus for heating panels wherein the circuit breaker is normally closed, and wherein operation of the circuit breaker opens both pairs of contacts, interrupting connection between the power source and the first and second wires.

An object of the invention is the provision of a safety apparatus for heating panels wherein the core means is unitary, and wherein all of the turns are made around the unitary core means.

Another object of the invention is the provision of a safety apparatus for heating panels wherein the sheet is elongated, and wherein the electrodes are positioned along longitudinal edges of the sheet.

These and other and further objects and features of the invention are apparent in the disclosure which is the foregoing and ongoing specification with the claims, and the drawings.

DETAILED DESCRIPTION OF THE DRAWINGS

Figure 1:
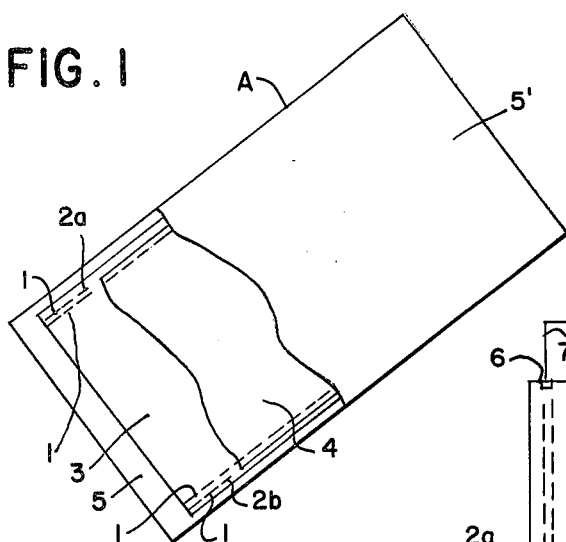
FIG. 1 is a cutaway view of elements of a thin flexible heating panel of the present invention.

The following is one application of the invention. FIG. 1 shows a partial cutout of the heat-emitting surface system A which is made out of fabric 3 with electrodes, 2a and 2b. The electrodes 2a and 2b consist of two thin wires 1 placed side by side and knitted into the fabric 3. The fabric 3 is coated with conductive materials such as conductive carbon paint 4. The fabric 3, electrodes 2a and 2b and the conductive material 4 are sandwiched between and laminated within insulation sheets 5 and 5' such as vinyl sheets.

Figure 2:
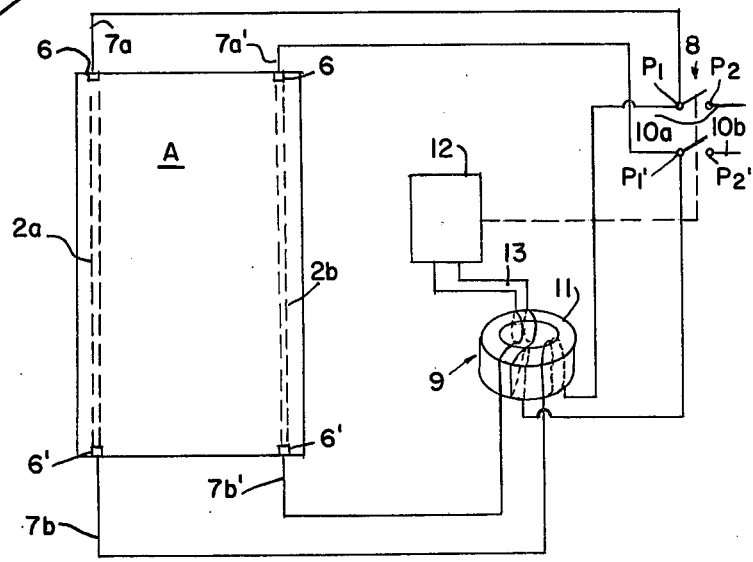
FIG. 2 is a schematic view of the safety system for the heating panel of the present invention.

As shown in FIG. 2, the lead wires 7a and 7a', 7b and 7b' to power sources are connected through terminals 6 and 6' to each end of both electrodes 2a and 2b of the heat-emitting surface A.

Of the lead wires, 7a, 7a', 7b and 7b', the ends of 7a and 7a' from terminals 6 are connected to secondary contacts $P_1$ and $P_1'$ of circuit breakers 8. The ends of 7b and 7b' from other terminals 6' are connected to the same secondary contacts, $P_1$ and $P_1'$ of circuit breakers 8 via a detector of induced current in the lead wires 7b and 7b'. The detector detects the moment of disconnection of electrodes, 2a and 2b.

The primary contacts $P_2$ and $P_2'$ of circuit breakers 8, are connected to the lead wires 10a and 10b, which in turn are connected to a power source. The detector 9 consists of a core 11 with one or two windings of the lead wires 7b and 7b' and with windings of a relay energizing wire 13 connected to a relay 12, which operates the circuit breaker 8.

The relay 12 opens the normally closed circuit breaker 8. For example, when the bias current is generated in lead wire 7b or 7b', another current will be induced into the lead wire 13 through the core 11. The induced current operates the relay 12, which in turn opens the circuit breaker 8.

Figure 3:
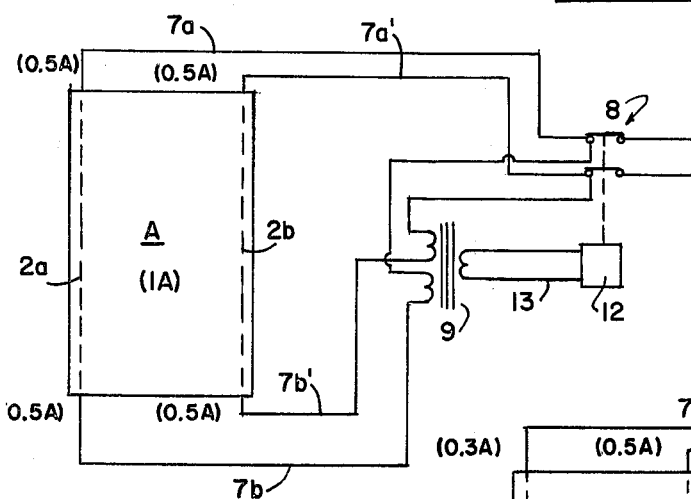
FIG. 3 is a schematic illustration of one form of the invention, showing current flows through the lead wires of a satisfactorily operating system.

As illustrated in FIG. 3, in normal condition, the current in the lead wires, 7a, 7a', 7b and 7b' can shunt accurately without any bias current. Therefore, the electric current can flow into the heat-emitting surface system A with no induced current, no relay movement, and with the circuit breakers 8 left closed.

Figure 4:
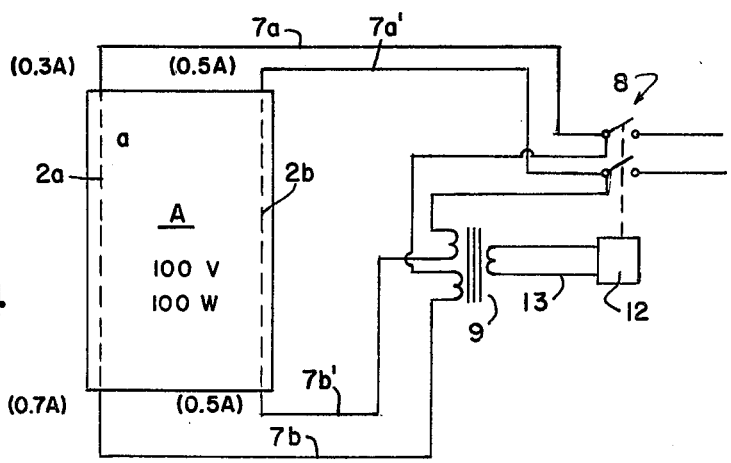
FIG. 4 is a schematic showing current flows in a system with a discontinuity in one electrode which has caused circuit breakers to disconnect power to the heating panel.

As illustrated in FIG. 4, however, should there be any disconnection of an electrode such as in electrode 2a at a, the current into the electrode 2a is biased between 7a and 7b, and eventually the bias current generates between both lead wires, 7a and 7a', and 7b and 7b'. To illustrate the point, let us take the case in which the heat-emitting surface system A has a 100V and 100W rating. In normal condition as shown in FIG. 3, the current in the lead wires 7a and 7a', and 7b and 7b' flows at a rate of 0.5 A for each passage. Upon the disconnection of the electrode 2a, as shown in FIG. 4, the current in the lead wire 7a becomes, for example, 0.3 A and the current in the lead wire 7b becomes 0.7 A, according to the location of disconnection. On the other hand, because of no disconnection of the electrode 2b, the current in the lead wires 7a' and 7b' connected to the electrode 2b is maintained at 0.5 A. Consequently the current between the lead wires 7b and 7b' becomes the bias current of 0.7 A and 0.5 A. Because of this bias current, a new current is induced through the core 11, and the induced current opens the circuit breakers 8 through the relay 12. As a result, the current into the heat-emitting surface system is cut off so that any electrical accidents caused by the disconnection of electrode 2a could be prevented. In the case of rare electric leakage, the monitoring leakage can be done with the same process as mentioned, and ensuing accidents can be prevented.

The aforementioned embodiment uses a circuit to detect bias current though a pair of lead wires from one end of both electrodes.

As explained, the invention resides in a device to cut off current into heat emitting surface systems upon the interruption of electrodes. The current induced by a bias current through the detector operates circuit breakers to stop the current into heat-emitting surface system. Knowing various kinds of electric heating spreads are prone to wire disconnection due to the weight and uses they have to take, this invention makes them safer by eliminating possible electrical accidents.

While the invention has been described with reference to specific embodiments, it will be obvious to those skilled in the art that modifications and variations of the invention may be made without departing from the scope of the invention, which is defined in the following claims.

I claim:

1. Safety heating panels apparatus comprising a sheet dielectric first and second electrodes connected to the sheet in spaced relationship between the electrodes, each electrode having spaced terminals connected to the electrode, electrical conductive heating layer on said dielectric sheet and connected between the electrodes, a first wire having ends connected to terminals on the first electrode and at least one turn in the first wire between its ends, a second wire having ends connected to terminals of the second electrode, and having a turn in the second wire, core means adjacent the turns, a relay having power terminals, and a relay wire connected to the power terminals and having a turn adjacent the core means, circuit breakers connected to the relay, whereby the relay operates the circuit breakers upon energization of the relay wire, the circuit breaker having first and second pairs of contacts and separate means to complete circuits between contacts in the first and second pairs, a contact in the first pair being connected to the first wire and a second contact in the first pair being connected to a power source, a contact in the second pair being connected to the second wire, and a second contact in the second contact in the second pair being connected to a power source.

2. The apparatus of claim 1 wherein the circuit breaker is normally closed, and wherein operation of the circuit breaker opens both pairs of contacts, interrupting connection between the power source and the first and second wires.

3. The apparatus of claim 1 wherein the core means is unitary, and wherein all of the turns are made around the unitary core means.

4. The apparatus of claim 1 wherein the sheet is elongated, and wherein the electrodes are positioned along longitudinal edges of the sheet.

* * * * *